(12) United States Patent
Khayyat et al.

(10) Patent No.: US 11,303,244 B2
(45) Date of Patent: Apr. 12, 2022

(54) UTILIZATION OF SOLAR SYSTEMS TO HARVEST ATMOSPHERIC MOISTURE FOR VARIOUS APPLICATIONS INCLUDING PANEL CLEANING

(71) Applicant: Saudi Arabian Oil Company, Dhahran (SA)

(72) Inventors: Ahmad W. Khayyat, Thuwal (SA); Bandar A. Fadhel, Dhahran (SA); Ahmed M. Saggaf, Thuwal (SA); Ahmad D. Hammad, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 246 days.

(21) Appl. No.: 16/775,829

(22) Filed: Jan. 29, 2020

(65) Prior Publication Data

US 2021/0234503 A1  Jul. 29, 2021

(51) Int. Cl.
*H02S 40/10* (2014.01)
*H02S 40/42* (2014.01)
(Continued)

(52) U.S. Cl.
CPC .............. *H02S 40/10* (2014.12); *F24S 10/95* (2018.05); *F24S 40/20* (2018.05); *F24S 40/55* (2018.05); *H02S 40/425* (2014.12)

(58) Field of Classification Search
CPC ........ H02S 40/10; H02S 40/425; F24S 40/20; F24S 40/55; F24S 40/44; F24S 10/95
(Continued)

(56) References Cited

U.S. PATENT DOCUMENTS

| 4,100,756 A | 7/1978 | Albertson |
| 4,133,183 A | 1/1979 | Albertson |

(Continued)

FOREIGN PATENT DOCUMENTS

| CN | 111412686 A | * | 7/2020 |
| GB | 2490335 A | | 10/2012 |

(Continued)

OTHER PUBLICATIONS

International Search Report and Written Opinion in Corresponding PCT Application No. PCT/US2021/015386 dated May 12, 2021. 12 pages.

(Continued)

*Primary Examiner* — Steven B McAllister
*Assistant Examiner* — Daniel E. Namay
(74) *Attorney, Agent, or Firm* — Leason Ellis LLP

(57) ABSTRACT

A solar collection system includes an absorption refrigeration system to generate water from atmospheric moisture, and to do so without the use of an electrically operated compressor. At least a portion of the solar energy captured by the solar collection system is used to operate the absorption refrigeration cycle. The absorption refrigeration cycle provides cooling that causes water in the atmosphere to condense into a liquid that can be collected and used for various applications. As one example, the collected liquid can be used for the cleaning of the solar collection system of contaminants like dust or bird drippings. In other applications, the water can be used outside the solar collection system including, but not limited to, irrigation, drinking, and other industrial purposes.

20 Claims, 2 Drawing Sheets

(51) Int. Cl.
*F24S 40/20* (2018.01)
*F24S 40/55* (2018.01)
*F24S 10/95* (2018.01)

(58) Field of Classification Search
USPC ........ 126/569, 635, 645; 60/641.8; 136/206, 136/244
IPC .................. H02S 40/10,40/42; F24J 2/46, 2/04
See application file for complete search history.

(56) References Cited

U.S. PATENT DOCUMENTS

| | | | |
|---|---|---|---|
| 4,285,211 A | 8/1981 | Clark | |
| 4,429,545 A | 2/1984 | Steinberg | |
| 7,043,934 B2 | 5/2006 | Radermacher et al. | |
| 8,523,980 B2* | 9/2013 | Fernandez-Han | E03B 3/28 95/288 |
| 9,973,141 B2 | 5/2018 | Hammad et al. | |
| 2004/0000165 A1 | 1/2004 | Max | |
| 2010/0170499 A1* | 7/2010 | Bar | B01D 53/261 126/635 |
| 2015/0251225 A1* | 9/2015 | Jagannathan | E03B 3/28 134/6 |
| 2015/0308717 A1 | 10/2015 | Rochier | |
| 2015/0357969 A1* | 12/2015 | Fernandez De Cordoba Sanz | H02S 40/425 136/246 |
| 2016/0204735 A1 | 7/2016 | Tomlinson | |
| 2016/0211796 A1* | 7/2016 | Hammad | F24S 50/00 |
| 2017/0184329 A1* | 6/2017 | Kim | F25B 27/007 |
| 2018/0170770 A1* | 6/2018 | Hedlund | H02S 40/10 |
| 2019/0044476 A1* | 2/2019 | Al-Otaibi | H02S 40/10 |
| 2019/0136073 A1* | 5/2019 | Bake | C07F 7/14 |
| 2019/0181799 A1* | 6/2019 | Naffa'a | G01N 21/17 |
| 2021/0265944 A1* | 8/2021 | Tanaka | F24S 40/20 |
| 2021/0351740 A1* | 11/2021 | Nagler | B08B 13/00 |
| 2021/0359644 A1* | 11/2021 | Wang | H02S 40/425 |
| 2021/0408958 A1* | 12/2021 | Sadat | H02S 10/20 |

FOREIGN PATENT DOCUMENTS

| | | | |
|---|---|---|---|
| JP | 2000279944 A | * | 10/2000 |
| JP | 2017070113 A | * | 4/2017 |

OTHER PUBLICATIONS

Databse WPI Week 200157 Thomson Scientific, London, GB; AN 2001-519563 XP00282741-& NL 1 013 802 C2 (Legerlede Holding BV) Jun. 12, 2001, abstract.

* cited by examiner

UTILIZATION OF SOLAR SYSTEMS TO HARVEST ATMOSPHERIC MOISTURE FOR VARIOUS APPLICATIONS INCLUDING PANEL CLEANING

FIELD OF THE DISCLOSURE

The present disclosure relates to photovoltaic, thermal, and other types of solar systems where a transmissive or reflective light receiving surface is exposed to the ambient environment and is subject to particulate contamination. More specifically, the present disclosure introduces technology for addressing particulate contamination of the light receiving surfaces utilized in such solar systems and does so by condensing atmospheric moisture into water using an assembly that replaces the electric compressor used in traditional vapor-compression cycles.

BACKGROUND OF THE DISCLOSURE

In many locals, clean water can be a scarce resource. Water is needed for drinking, hygiene, irrigation, and other industrial purposes.

As one non-limiting example, solar collector systems often require a water supply in order to maintain a clean surface of the solar system. As solar systems are exposed to the environment, dirt and debris can collect on the surface of the solar collector. The presence of the dirt and debris can negatively affect the efficiency and performance of the solar collector. Accordingly, it is desirable to periodically clean the surface of the solar collector, which is typically done using water. As such, a water supply is required to provide cleaning functions, among other things.

Continuing this example, solar systems are often located in remote locations that do not have readily available water sources. This problem has been solved in the past by providing a condenser system that can generate water by condensing the water from humidity in the atmosphere. U.S. Pat. No. 9,973,141 is one such example. However, in the past these systems typically rely upon the use of a compressor for compressing a refrigerant in the condenser cycle. A compressor requires power (i.e., electricity) to operate and includes moving parts that can wear overtime, which can require maintenance and/or replacement.

The present disclosure solves these and other problems with a technical solution as disclosed herein.

SUMMARY OF THE DISCLOSURE

According to a first aspect of the disclosure, a solar energy collection system includes a system for generating water using an absorption refrigeration cycle in lieu of an electrical compressor such that the generated water can be used for cleaning the solar energy collection system and for other purposes. The system includes a solar collector having a first surface exposed to solar energy and a second surface opposite the first surface. An absorber containing a working fluid that includes a solution of a coolant fluid and an absorption fluid is fluidly connected to a generator. The generator is connected to receive the solution from the absorber. The generator can be supported by the solar collector such that at least a portion of the solar energy can be absorbed by the solution to separate the coolant fluid from the absorption fluid. The generator is fluidly connected to the absorber to return the absorption fluid to the absorber. A condenser is fluidly connected to the generator to receive the coolant fluid. An evaporator is fluidly connected to the condenser to receive the coolant fluid. The evaporator can be supported adjacent the second surface of the solar collector and arranged such that the coolant fluid can affect a heat transfer to lower the temperature of the solar collector. The evaporator and its cooling effect are further capable of causing atmospheric water to condense on the solar collector. The absorber is fluidly connected to the evaporator to receive the coolant fluid. The absorber provides a chamber in which the coolant fluid and absorption fluid can combine to reform the working fluid solution. A water collector disposed at a lower end of the solar collector is arranged to collect water that travels across the surface of the solar collector by gravity.

According to another aspect of the disclosure, a solar energy collection system that includes a system for generating water using an absorption refrigeration cycle is provided. The generated water can be used for cleaning the solar energy collection system. The system includes a solar collector having a first surface exposed to solar energy and a second surface opposite the first surface. An absorber containing a working fluid that includes a solution of a coolant fluid and an absorption fluid is fluidly connected to a generator. The generator is connected to receive the solution from the absorber. The generator can be supported by the solar collector such that at least a portion of the solar energy can be absorbed by the solution to separate the coolant fluid from the absorption fluid. The generator is fluidly connected to the absorber to return the absorption fluid to the absorber. A condenser is fluidly connected to the generator to receive the coolant fluid. An evaporator is fluidly connected to the condenser to receive the coolant fluid. The evaporator can be supported adjacent the second surface of the solar collector and arranged such that the coolant fluid can affect a heat transfer to lower the temperature of the solar collector. The evaporator and its cooling effect is further capable of causing atmospheric water to condense on the solar collector. The absorber is fluidly connected to the evaporator to receive the coolant fluid. The absorber provides a chamber in which the coolant fluid and absorption fluid can combine to reform the working fluid solution. A cleaning system that includes a water collector disposed at a lower end of the solar collector is provided. The water collector is capable of collecting water that can travel across the surface of the solar collector. A nozzle can be disposed at an upper end of the solar collector. The nozzle is fluidly connected to the water collector and is capable of spraying water collected by the water collector on the first surface of the solar collector to clean the first surface of the solar collector.

According to a further aspect, the coolant fluid is ammonia and the absorber fluid is water.

According to another aspect, a filter is fluidly disposed between the water collector and the nozzle to remove dirt in the water.

According to a still further aspect, a storage tank is fluidly disposed between the water collector and the nozzle to provide storage of the water between cleaning operations.

According to a further aspect, a pump is fluidly disposed between the absorber and the generator to transfer the solution from the absorber to the generator.

According to yet another aspect, a throttle is fluidly disposed between the condenser and the evaporator.

According to another aspect, a method for cleaning a solar energy collection system that includes generating water using an absorption refrigeration cycle is provided. The method includes the steps of generating water on a first surface of a solar collector by operation of a refrigeration system, the first surface being exposed to solar energy, and the solar collector having a second surface opposite the first surface. The refrigeration system is operated by transferring a working fluid that includes a solution of a coolant fluid and an absorption fluid from an absorber to a generator fluidly connected to the absorber. The generator is supported by the solar collector such that at least a portion of the solar energy can be absorbed by the solution. The coolant fluid is separated from the absorption fluid as a result of absorption of at least the solar energy. The generator is separately fluidly connected to the absorber and a condenser. The separated absorption fluid is returned to the absorber. The separated coolant fluid is transferred to the condenser wherein the separated coolant fluid condenses. The condensed coolant fluid is further transfer to an evaporator fluidly connected to the condenser. The evaporator is supported adjacent the second surface of the solar collector and arranged such that the coolant fluid can affect a heat transfer to lower the temperature of the solar collector. As a result of heat transfer between the coolant fluid in the evaporator and the solar collector, water condenses out of the atmosphere and onto the first surface of the solar collector. The coolant fluid is returned to the absorber, wherein the absorber is fluidly connected to the evaporator to receive the coolant fluid. The absorber provides a chamber in which the coolant fluid and absorption fluid can combine to reform the working fluid solution. With respect to the condensed water, a cleaning of the first surface of the solar collector occurs by allowing the condensed water to traverse the first surface of the solar collector as a result of gravity acting on the condensed water.

Optionally, the solar collector can include one or more condensation panels which define fins configured to be chilled by the coolant fluid.

According to a further aspect, the method further includes the steps of collecting the condensed water after it traverses the surface of the solar collector using a water collector disposed at a lower end of the solar collector. At least a portion of the water collected by the water collector is sprayed on the first surface of the solar collector to clean the first surface of the solar collector using a nozzle disposed at an upper end of the solar collector, the nozzle being fluidly connected to the water collector, while further portions of the water collected remain available for the same cleaning operation or for other applications.

According to a still further aspect, the water sprayed on first surface of the solar collector is recovered using the water collector According to another aspect, the water collected by the water collector is filtered via a filter fluidly disposed between the water collector and the nozzle.

According to yet another aspect, at least a portion of the collected water is stored via a storage tank fluidly disposed between the water collector and the nozzle.

According to a further aspect, the coolant fluid is ammonia and the absorber fluid is water.

According to another aspect, the solution is pumped from the absorber to the generator via a pump fluidly connected between the absorber and generator.

According to a further aspect, a throttle is fluidly disposed between the condenser and the evaporator.

DETAILED DESCRIPTION OF CERTAIN EMBODIMENTS OF THE DISCLOSURE

The present disclosure utilizes the direct heat capture in a solar thermal flat plate collector arrangement to provide an absorption refrigeration cycle in order to cool the back of the solar thermal panel and allow water content in the air to condense on the surface of the panel. The panel can be solar (thermal), photovoltaic, or a combination of both types of constructions. The integration of an absorption refrigeration cycle using ammonia, or lithium-bromide, or any chemicals with similar properties distinguishes this disclosure from other approaches which require the use of rotating equipment, including compressors in particular as it saves the energy required to run the compressor and such equipment. The condensed water can be used in a variety of applications, including, among others, in self-cleaning of the solar panel itself.

In one implementation, by way of illustration, the present disclosure can be utilized to introduce technology for addressing particulate and other contamination of the light receiving surfaces utilized in photovoltaic, thermal, and other types of solar systems where a transmissive or reflective light receiving surface is exposed to the ambient and is subject to particulate contamination. Such contamination, and the corresponding operational efficiency drop, are major challenges in today's solar systems, especially where particles and/or dirt concentration is high, as would be the case where the system is installed in remote, urban, or offshore locations. In addition, contamination can result from bird droppings landing on solar panels and from the particulates associated with such matter.

Figure 1:
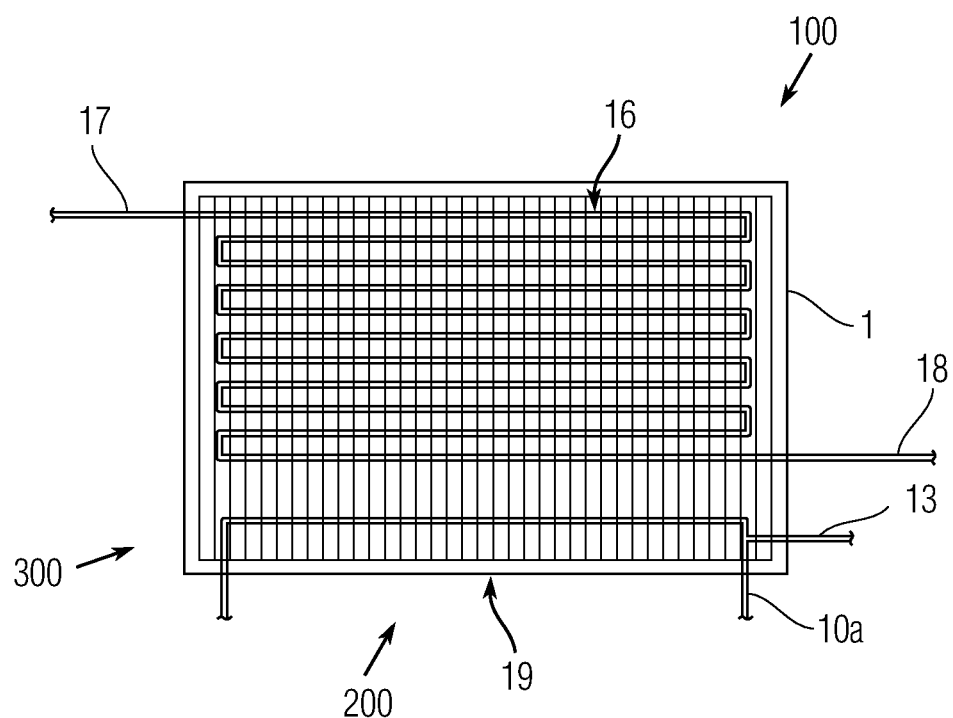
FIG. 1 shows a schematic top view of a flat plate collector with a condenser system in accordance with one embodiment of the present disclosure.
Figure 2:
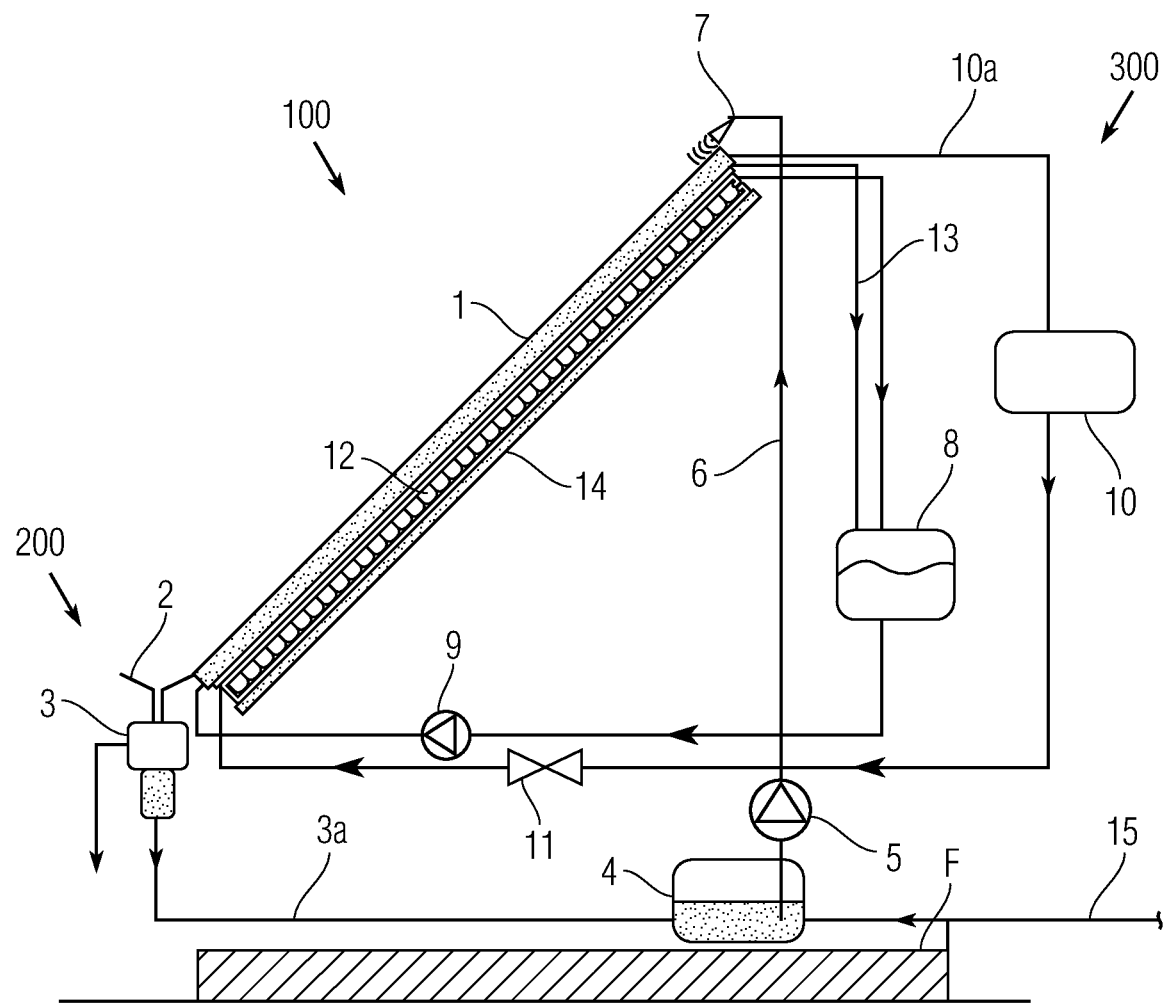
FIG. 2 shows a schematic side view of the flat plate collector with a condenser system of FIG. 1.

More generally, however, and referring to FIGS. 1 and 2, a solar water collector system 100 configured to condense and thereby extract water from atmospheric moisture is illustrated. The system 100 comprises a solar energy receiving surface 1 exposed to ambient air. The solar receiving surface 1 can be a photovoltaic solar panel, a thermal solar collector, or other type of solar collector. As shown in FIG. 1, the light receiving surface 1 is a flat plate solar thermal collector that can collect solar energy to heat water. As part of the solar thermal collector system 100 according to the present disclosure, a commercially available solar thermal flat plate collector is modified by adding an additional line for an ammonia solution, a lithium-bromide solution, or another coolant solution. This additional part is the generator component of the refrigeration system used to condense and collect water from the atmosphere. In particular, water enters the collector 1 through an input line 17 and is passed through heat exchanger lines 16. As the water passes through the heat exchanger lines, solar thermal energy collected by the solar collector 1 is transferred to the water and causes the temperature of the water to increase. As shown in FIG. 1, the water exits the collector 1 through output line 18 as steam. This steam can be used for further operations, such as powering a turbine for power generation, provide heat energy (e.g., for heating buildings), or for other operations and purposes.

As such, the arrangement and method of the present disclosure provide a thermodynamic cooling cycle with a solar thermal collector by utilizing the solar heat in the panel as a heat input into the generator part of the refrigeration cycle. In the meantime, the cooling is effectuated based on an absorption refrigeration cycle. The absorption refrigeration cycle comprises five principal components: an absorber 8, a generator 19, a condenser 10, a throttling valve 11, and an evaporator 12. Ammonia is mixed with water in the absorber 8 and because ammonia is readily soluble in cold water, the ammonia and water mix and form a solution. A pump 9 advances the solution to the generator 19.

In certain embodiments, the generator is integrated into the fabrication of the solar thermal flat plate collector, such as is shown in the embodiment of FIG. 1. In the embodiment of FIG. 1, the generator 19 comprises an added, metallic tube line that takes the aqua/ammonia solution in at low temperature and pressure. Direct exposure to sun radiation causes the solution to heat. When heated, ammonia or lithium-bromide or another coolant solution, as the case may be in a given embodiment, separates from the solution and exits the generator 19 at high pressure. Consequently, the absorber/generator arrangement of FIG. 1 replaces the compressor of traditional vapor-compression cycles and provides required heat to raise temperature and pressure of ammonia or lithium-bromide before entering the condenser 10. The water that remains after ammonia separates is sent back via a return duct 13 to the absorber 8, as shown in FIG. 1 and further illustrated in FIG. 2.

The condensed ammonia is then sent through a throttling valve 11 to the evaporator 12, such as evaporator coils positioned along a rear surface of the panel 1 (see FIG. 2) so as to be thermally coupled to the panel. The evaporator 12 absorbs heat from the back of the solar panel. As such, the evaporator 12 removes heat from the panel and cools the panel down. In turn, this allows water from the atmosphere to condense on the front surface of the panel 1, as shown in FIG. 2, or the water can condense on another external surface in alternative structural configurations in which an evaporator 12 is employed as described. In the meantime, ammonia exits the evaporator 12 at low temperature and pressure. The ammonia advances to the absorber 8 where it mixes with water to once again form a solution. This completes the refrigeration cycle and provides the objective of condensing the moist in the air on top of the panels for collection and use in a variety of purposes, including possibly the cleaning of the panel itself.

Referring again to FIG. 1, a water generation system 200 comprises a portion of the solar thermal collector system 100. The ammonia and cold water solution enters the solar collector 1. Alternatively, a lithium-bromide and water solution is employed. As discussed in more detail below, the generator 19 utilizes the thermal energy collected by the collector 1 to cause the ammonia to separate from the water. As the solution passes through the collector 1, the solar thermal energy is transferred to solution via a heat exchange operation and results in the solution absorbing the heat. The absorption of the heat into the solution causes the ammonia to evaporate and separate from the water. The separated, high pressure ammonia is returned to a condenser and the water is separately returned to an absorber, as described in more detail below in connection with FIG. 2. The absorption of the heat energy via the generator 17 causes a cooling on the surface of the panel, which causes water to condense of the cooled surface, which is described in more detail below.

Referring to FIG. 2, the solar collector surface 1 is shown orientated to collect solar thermal energy. The water generation system 200 is combined with a water collection and cleaning (WCC) system 300, which is included in certain embodiments according to the disclosure, are shown in schematic detail. In an alternative configuration, the solar collector 1 can include one or more condensation panels which define fins which provide a heat-efficient structural arrangement for being chilled by the coolant fluid.

Referring first to the WCC system 300 includes a collection structure 2, which can be a funnel or gutter-type structure, located at the base of the solar collector surface 1. The funnel 2 collects any water generated by atmospheric condensation on the collector surface. Water can be collected from atmospheric condensation throughout the day, and when ambient conditions are suitable, in the evening as well. The funnel is positioned to collect water that moves across the panel by action of gravity moving the water downward. Optionally, the funnel 2 can also collect any water that is applied to the collector surface 1 as part of a cleaning operation, which can be recycled for use in future cleaning operations.

The funnel 2 directs the collected water through a filter 3 to remove any dirt particles in the water. In part, this can include filtering out any dirt removed as a result of collecting water after a cleaning operation performed on the panel 1. After passing through filter 3, the water, with the dirt now removed, passes through a line 3a to a water storage tank 4. Optionally, an auxiliary water supply line 15 can be included to provide a supplemental source of water, in the event that other water sources are, in fact, available. However, the invention has particular utility in remote areas or areas with limited access to water.

It should be noted that the various lines extending between different structures in FIG. 2 schematically represent fluid transfer lines and the arrows on those lines indicate the direction of flow. The fluid transfer lines can be piping, tubing, or other suitable structure for transporting liquid from one location to another within the system.

The water in storage tank 4 can be stored until it is needed for future cleaning operations. If water is required for a cleaning operation, pump 5 moves the water from the storage tank 4 through line 6 to water nozzles 7. Water nozzles 7 are arranged to spray the water on the collector surface 1. The water travels down the inclined surface of the collector via gravity. As water moves across the surface, it removes dirt on the surface thereby cleaning the collector surface. As discussed above, funnel 2 is located at the bottom of the collector surface 1 to collect the cleaning water, which can be filter and reused, thereby completing the cleaning cycle.

The water generation system 200 generates water that can be used in the cleaning and collection system 300. The water generation system 200 functions based the absorption refrigeration cycle. The water generation system includes an absorber 8. In the absorber 8, cold water is mixed with ammonia, for example. Ammonia is readily soluble in cold water and, accordingly, the water and ammonia form a solution in absorber 8. The water and ammonia solution is pumped from the absorber 8 via pump 9. Pump 9 pumps the water and ammonia solution to the generator 19, which is incorporated into the collector 1. The generator 19 can consist of a pipe (in a straight run as shown in FIG. 1 or a serpentine run to increase thermal energy absorption) that is preferably metal to increase the thermal transfer rate between the collected solar thermal energy and the ammonia and water solution in the pipe.

The ammonia and water solution enters the generator 19 at a low temperature and pressure. The exposure to solar radiation causes the ammonia and water solution to absorb thermal energy and heat up. The heating of the solution causes the ammonia to separate from the water. Since the ammonia has been heated and it has transitioned to the gaseous form, it is now at a high pressure. Accordingly, the attainment of the high pressure ammonia via the generator eliminates the need for a compressor in a tradition vapor-compression cycle and provides the required heat to raise the temperature and pressure of the ammonia before it enters the condenser 10 via collection line 10*a*. The water that remains after the ammonia separates from the solution is returned via line 13 to absorber 8.

Upon entering the condenser 10, the separated ammonia undergoes condensation and is then passed through a throttling valve 11 to evaporator 12. The evaporator 12 is located adjacent to the surface of the solar collector 1 and provides a surface area to increase the efficiency of heat transfer. Accordingly, the evaporation 12 can comprise a coil of tubing that extends across the back surface of the solar collector 1. Insulation 14 can be provided adjacent to the evaporator 12 on the side opposite the solar collector 1 in order to promote heat transfer between the evaporator and the solar collector and reduce undesired heat transfer between the evaporator and the environment.

As the ammonia flows through the evaporator 12, the heat transfer process acts to absorb heat from the back of the solar collector, which causes the front surface of the solar collector 1 to cool down as well. The cooling of the solar collector 1 causes water from the atmosphere to condense on the surface of the solar collector 1, which can be used in the cleaning system 300, as discussed in more detail below.

The ammonia exits the evaporator 12 at a low temperature and pressure and enters the absorber 8. As discussed above, the water previously separated from the ammonia and water solution after passing through the generator 19 was returned to the absorber 8. At this stage in the cycle, the ammonia exiting the evaporator 12 mixes with the water in the absorber to form an ammonia and water solution. Accordingly, the refrigeration cycle is complete and the ammonia and water solution can be run through the system as described above to repeat the process and generate additional water from the atmosphere by condensation of water on the surface of the solar collector. Notably, while the above system describes the used of an ammonia and water solution as the working fluid in the absorption refrigeration cycle, other suitable working fluids can also be used, such as, for example, a lithium bromide and water solution can be used with the lithium bromide replacing the ammonia. In the ammonia and water solution, the ammonia acts as the coolant fluid and the water acts as the absorption fluid in that the water absorbs the ammonia in the absorber after the ammonia works to cool the surface of the solar collector.

The condensation of water of the light receiving surface of the solar collector 1 acts to provide cleaning of the surface of the solar collector surface. The light receiving surface of the solar collector 1 is the surface that is normally exposed to solar energy during normal operation to collect solar energy. As shown in FIG. 2, the light receiving surface is opposite the side of the solar collector that includes insulation 14. Moreover, as the condensed water continues to collect and drip down the surface of the solar collector, the water can be collected by the funnel 2 and incorporated into the cleaning system 300, as discussed above. Accordingly, the system 100 provides a structure that permits for the generation of water from atmosphere. The so-generated water is now available for a variety of utilizations, such as cleaning of the solar collector itself, in which the water can be collected into the cleaning system 300 and provide a cycle for water generation, collection, and spraying on the surface for cleaning.

Thus, as one non-limiting example, the system can be operated as described below in order to generate water from atmospheric condensation to provide cleaning of the solar collector's solar energy receiving surface. The water is generated on the surface of the solar collector by operation of the refrigeration system described above. The operation of the refrigeration system includes transferring the working fluid (i.e., the water and ammonia solution) from absorber 8 to generator 19. Pump 9 facilitates the transfer by pumping the solution from the absorber 8 to the generator 19. The ammonia is separated from the water in the generator 19 as a result of absorption of at least portion of the solar energy by the solution. The separated water is returned to the absorber 8. The separated ammonia, which is now in a gaseous state, is transferred to the condenser 10. In the condenser 10, the ammonia can condense from the gaseous state to a liquid state. The condensed ammonia is transferred from the condenser 10 to the evaporator 12. As the condensed ammonia is transferred to the evaporator 12, it passes through throttle 11, and arrives at the evaporator 12 at a lower pressure and temperature.

As the ammonia travels through the evaporator 12, a heat transfer occurs resulting in a lowering of the temperature of the solar collector 1. The lowered temperature of the solar collector 1 causes water to condense out of the atmosphere and onto the surface of the solar collector. The ammonia is returned from the evaporator 12 to the absorber 8, which results in the ammonia and the previously returned water to reform a solution. Accordingly, the recombined solution can be cycled again through the refrigeration system, as described above.

As the water condenses on the surface of the solar collector 1 exposed to the solar radiation (i.e., the side of the solar collector opposite the insulation 14), the condensed water traverses the surface as a result of gravity, which results in the water traveling from the top edge of the solar collector to the bottom edge along the incline of the solar collector 1, as shown in FIG. 2. The traversal of the water across the solar collector surface results in a cleaning of the surface.

Accordingly, a cleaning of the surface of the solar collector can be accomplished using at least a portion of the water that has been generated and collected. The cleaning of the solar collector can further be enhanced by collecting the condensed water after it traverses the surface of the solar collector via water collection funnel 2. The water is then passed through filter 3 to filter out the dirt from the water. The water can then be stored in storage tank 4 to be used in future operations, including further cleaning operations or other operations (irrigation, drinking, etc.). The collected water can be sprayed on the surface of the solar collector 1 using nozzles 7 to further clean the surface of the solar collector 1. A pump 5 can pump the water from storage tank 4 to nozzles 7 for spraying on the surface of the solar collector. The sprayed water can be recovered by the water collector 2 and reused in further cleaning operations. It will be understood that a water and ammonia solution is one possible fluid to pass through the heat exchanger, but other solutions can be used in a given implementation. As a non-limiting example, a lithium-bromide and water solution can be used in a particular embodiment in accordance with the disclosure.

As discussed above, a refrigeration cycle is shown and described that provides a means for generating water from the atmosphere by use of an absorption refrigeration cycle. The cycle can be repeated in order to continuously generate water. As discussed above, the absorption refrigeration cycle offers advantages over other systems, such as a vapor compression refrigeration cycle in that the use of a compressor is eliminated. Moreover, the use of an absorption refrigeration cycle in order to generate water to clean solar collectors in a solar generation system provides a synergistic benefit in that the solar energy used to operate the refrigeration cycle is readily available as a part of the solar collector system and its infrastructure. This synergistic benefit is particularly illustrated in the case where the solar collector is a photovoltaic system in that the operation of the solar photovoltaic system is improved by the absorption of excess heat from the PV panel since the efficiency of the PV panels can be negatively impacted by excessive heat. As such, the absorption refrigeration cycle can operate by using "free" thermal energy that is inherently present as part of solar collection operation and, as in the case of a PV system, can improve the operation of the system. Furthermore, as noted, the water generated from the atmosphere can be used for other purposes besides cleaning, such as providing a drinking water source, which can be particularly advantageous as solar collect systems may be located in remote areas where water is scarce and greatly needed, or for multiple purposes by allocating portions of the generated water for various purposes.

Notably, the figures and examples above are not meant to limit the scope of the present application to a single implementation, as other implementations are possible by way of interchange of some or all of the described or illustrated elements. Moreover, where certain elements of the present application can be partially or fully implemented using known components, only those portions of such known components that are necessary for an understanding of the present application are described, and detailed descriptions of other portions of such known components are omitted so as not to obscure the application. In the present specification, an implementation showing a singular component should not necessarily be limited to other implementations including a plurality of the same component, and vice-versa, unless explicitly stated otherwise herein. Moreover, applicants do not intend for any term in the specification or claims to be ascribed an uncommon or special meaning unless explicitly set forth as such. Further, the present application encompasses present and future known equivalents to the known components referred to herein by way of illustration.

The foregoing description of the specific implementations will so fully reveal the general nature of the application that others can, by applying knowledge within the skill of the relevant art(s) (including the contents of the documents cited and incorporated by reference herein), readily modify and/or adapt for various applications such specific implementations, without undue experimentation, without departing from the general concept of the present application. Such adaptations and modifications are therefore intended to be within the meaning and range of equivalents of the disclosed implementations, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant art(s). It is to be understood that dimensions discussed or shown are drawings are shown accordingly to one example and other dimensions can be used without departing from the disclosure.

The subject matter described above is provided by way of illustration only and should not be construed as limiting. Various modifications and changes can be made to the subject matter described herein without following the example embodiments and applications illustrated and described, and without departing from the true spirit and scope of the invention encompassed by the present disclosure, which is defined by the set of recitations in the following claims and by structures and functions or steps which are equivalent to these recitations.

What is claimed is:

1. A system for condensing atmospheric moisture free of an electrical compressor, comprising:
   a solar collector having a first surface exposed to solar energy and a second surface opposite the first surface;
   an absorber, the absorber containing a working fluid that includes a solution of a coolant fluid and an absorption fluid;
   a generator fluidly connected to the absorber for receiving the solution from the absorber, the generator being supported by the solar collector such that at least a portion of the solar energy can be absorbed by the solution to separate the coolant fluid from the absorption fluid, wherein the generator is fluidly connected to the absorber to return the absorption fluid to the absorber;
   a condenser fluidly connected to the generator to receive the coolant fluid;
   an evaporator fluidly connected to the condenser to receive the coolant fluid, the evaporator being supported adjacent the second surface of the solar collector and arranged such that the coolant fluid can affect a heat transfer to lower the temperature of the solar collector and is further capable of causing atmospheric water to condense on the solar collector;
   wherein the absorber is fluidly connected to the evaporator to receive the coolant fluid, the absorber providing a chamber in which the coolant fluid and absorption fluid can combine to reform the working fluid solution; and
   a water collector disposed at a lower end of the solar collector, the water collector configured to collect water that travels across the surface of the solar collector by gravity.

2. The system of claim 1, wherein coolant fluid is ammonia and the absorber fluid is water.

3. The system of claim 1, further including a nozzle and a filter fluidly disposed between the water collector and the nozzle to remove dirt in the water.

4. The system of claim 1, further including a storage tank fluidly disposed downstream of the water collector.

5. The system of claim 1, further including a pump fluidly disposed between the absorber and the generator to transfer the solution from the absorber to the generator.

6. The system of claim 1, further including a throttle fluidly disposed between the condenser and the evaporator.

7. A solar energy collection system that includes a system for generating water using an absorption refrigeration cycle in lieu of an electrical compressor, wherein the generated water can be used for cleaning the solar energy collection system and for other purposes, comprising:
   a solar collector having a first surface exposed to solar energy and a second surface opposite the first surface;
   an absorber, the absorber containing a working fluid that includes a solution of a coolant fluid and an absorption fluid;
   a generator fluidly connected to the absorber for receiving the solution from the absorber, the generator being supported by the solar collector such that at least a portion of the solar energy can be absorbed by the solution to separate the coolant fluid from the absorption fluid, wherein the generator is fluidly connected to the absorber to return the absorption fluid to the absorber;

a condenser fluidly connected to the generator to receive the coolant fluid;

an evaporator fluidly connected to the condenser to receive the coolant fluid, the evaporator being supported adjacent the second surface of the solar collector and arranged such that the coolant fluid can affect a heat transfer to lower the temperature of the solar collector and is further capable of causing atmospheric water to condense on the solar collector;

wherein the absorber is fluidly connected to the evaporator to receive the coolant fluid, the absorber providing a chamber in which the coolant fluid and absorption fluid can combine to reform the working fluid solution; and a cleaning system, comprising;
- a water collector disposed at a lower end of the solar collector, the water collector being capable of collecting water that can travel across the surface of the solar collector; and
- a nozzle disposed at an upper end of the solar collector, the nozzle being fluidly connected to the water collector, the nozzle being capable of spraying at least a portion of the water collected by the water collector on the first surface of the solar collector to clean the first surface of the solar collector, while further portions of the water collected remain available for the same cleaning operation or for other applications, wherein the solar collector can include one or more condensation panels which define fins configured to be chilled by the coolant fluid.

8. The system of claim 7, wherein coolant fluid is ammonia and the absorber fluid is water.

9. The system of claim 7, further including a filter fluidly disposed between the water collector and the nozzle to remove dirt in the water.

10. The system of claim 7, further including a storage tank fluidly disposed between the water collector and the nozzle to provide storage of the water between cleaning operations.

11. The system of claim 7, further including a pump fluidly disposed between the absorber and the generator to transfer the solution from the absorber to the generator.

12. The system of claim 7, further including a throttle fluidly disposed between the condenser and the evaporator.

13. A method for cleaning a solar energy collection system that includes generating water using an absorption refrigeration cycle, comprising:

generating water on a first surface of a solar collector by operation of a refrigeration system, the first surface being exposed to solar energy, and the solar collector having a second surface opposite the first surface;

operating the refrigeration system, comprising the steps of:
- transferring a working fluid that includes a solution of a coolant fluid and an absorption fluid from an absorber to a generator fluidly connected to the absorber, the generator being supported by the solar collector such that at least a portion of the solar energy can be absorbed by the solution,
- separating the coolant fluid from the absorption fluid as a result of absorption of at least the solar energy, wherein the generator is separately fluidly connected to the absorber and a condenser,
- returning the separated absorption fluid to the absorber;
- transferring the separated coolant fluid to the condenser wherein the separated coolant fluid condenses;
- transferring the condensed coolant fluid to an evaporator fluidly connected to the condenser, the evaporator being supported adjacent the second surface of the solar collector and arranged such that the coolant fluid can affect a heat transfer to lower the temperature of the solar collector;
- causing water to condense out of the atmosphere and onto the first surface of the solar collector as a result of heat transfer between the coolant fluid in the evaporator and the solar collector;
- returning the coolant fluid to the absorber, wherein the absorber is fluidly connected to the evaporator to receive the coolant fluid, the absorber providing a chamber in which the coolant fluid and absorption fluid can combine to reform the working fluid solution; and cleaning the first surface of the solar collector by allowing the condensed water to traverse the first surface of the solar collector as a result of gravity acting on the condensed water.

14. The method of claim 13, further including the steps of:
collecting the condensed water after it traverses the surface of the solar collector using a water collector disposed at a lower end of the solar collector; and
spraying at least a portion of the water collected by the water collector on the first surface of the solar collector to clean the first surface of the solar collector using a nozzle disposed at an upper end of the solar collector, the nozzle being fluidly connected to the water collector while further portions of the water collected remain available for the same cleaning operation or for other applications.

15. The method of claim 14, further including the step of recovering the water sprayed on first surface of the solar collector using the water collector.

16. The method of claim 14, further including the step of filtering the water collected by the water collector via a filter fluidly disposed between the water collector and the nozzle.

17. The method of claim 14, further including the step of storing at least a portion of the collected water via a storage tank fluidly disposed between the water collector and the nozzle.

18. The method of claim 13, wherein coolant fluid is ammonia and the absorber fluid is water.

19. The method of claim 13, further including the step of pumping the solution from the absorber to the generator via a pump fluidly connected between the absorber and generator.

20. The method of claim 13, further including a throttle fluidly disposed between the condenser and the evaporator.

* * * * *